United States Patent Office 2,939,567
Patented June 7, 1960

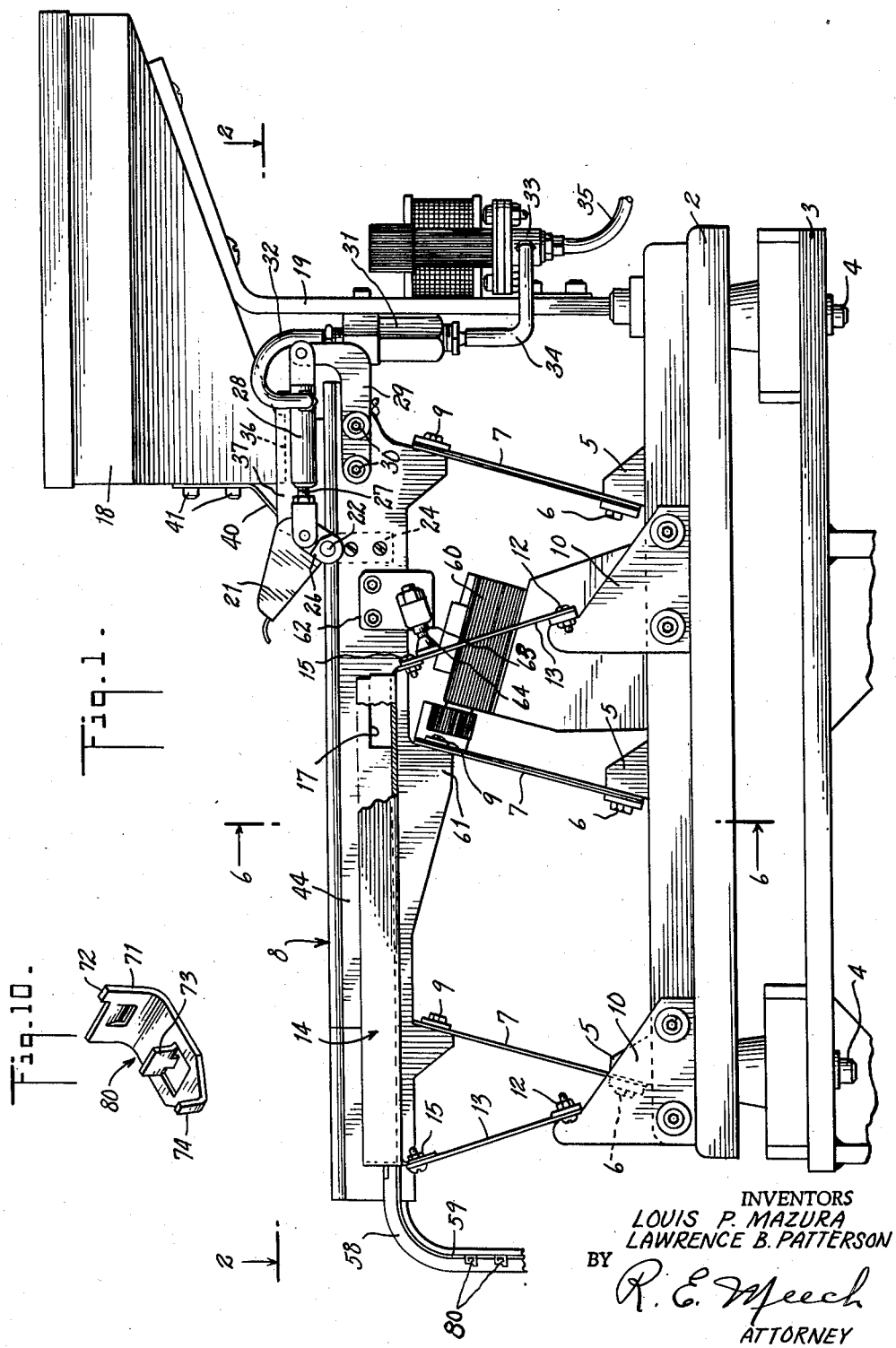

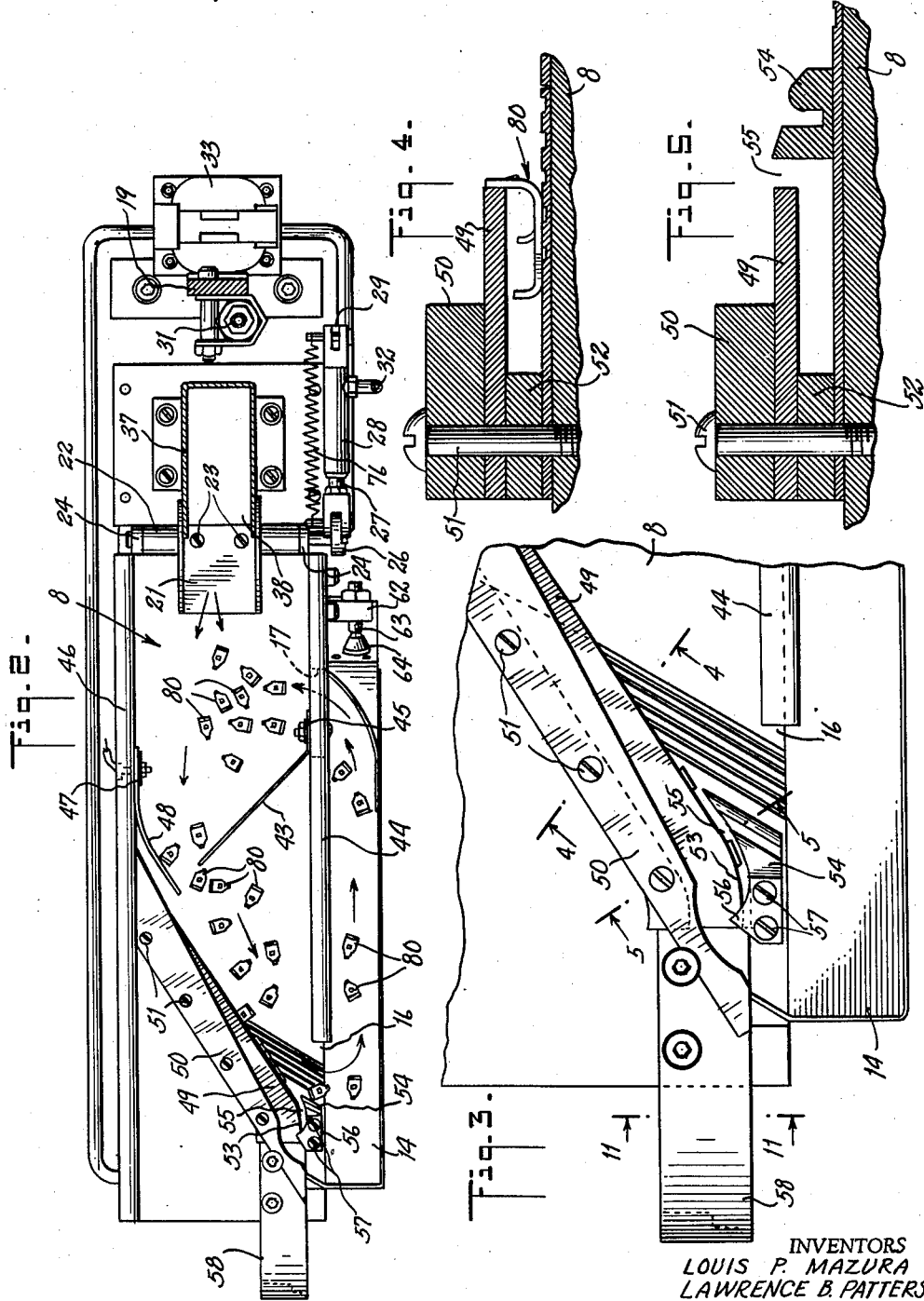

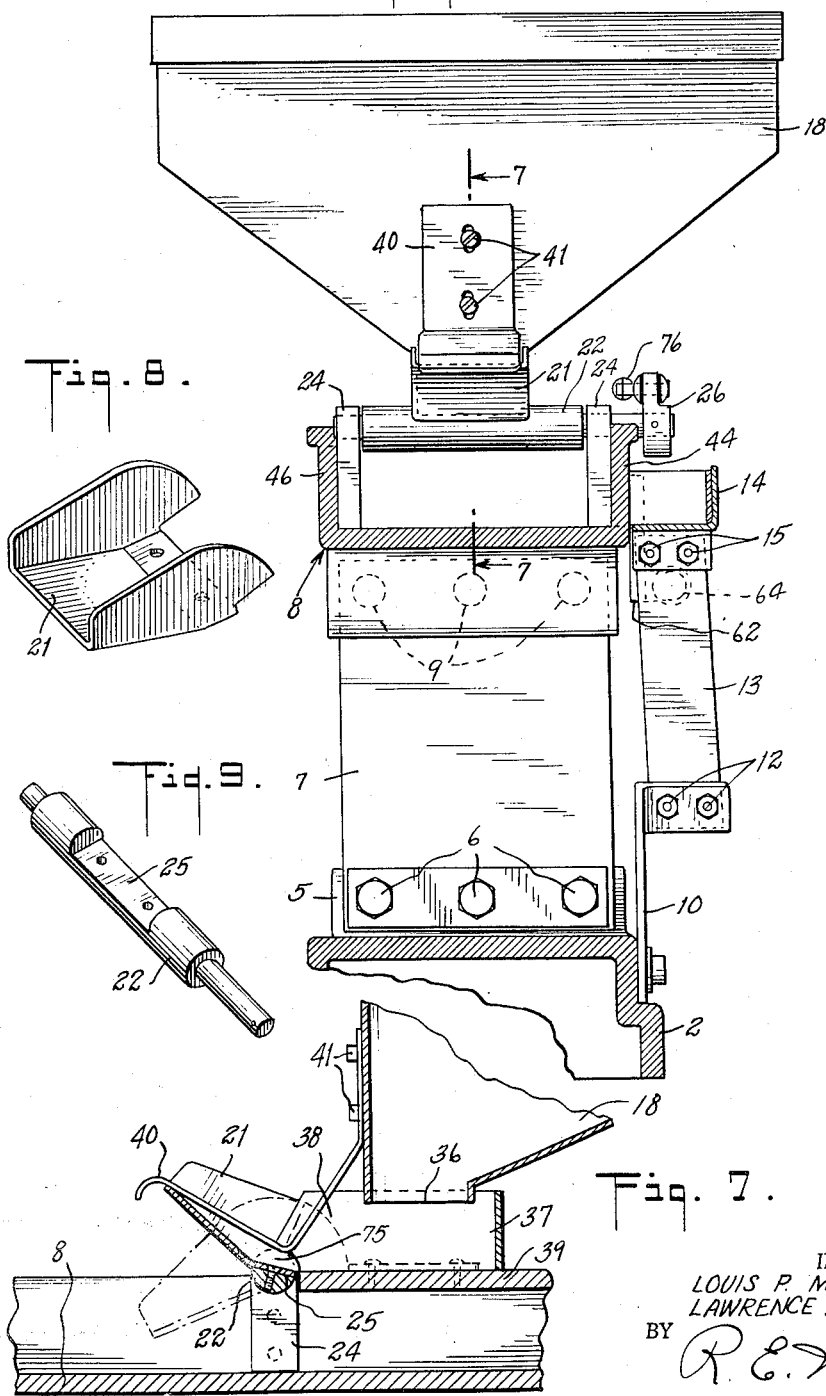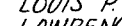

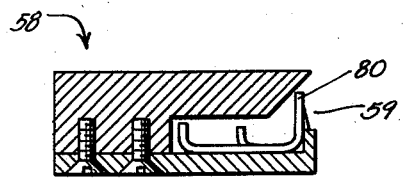
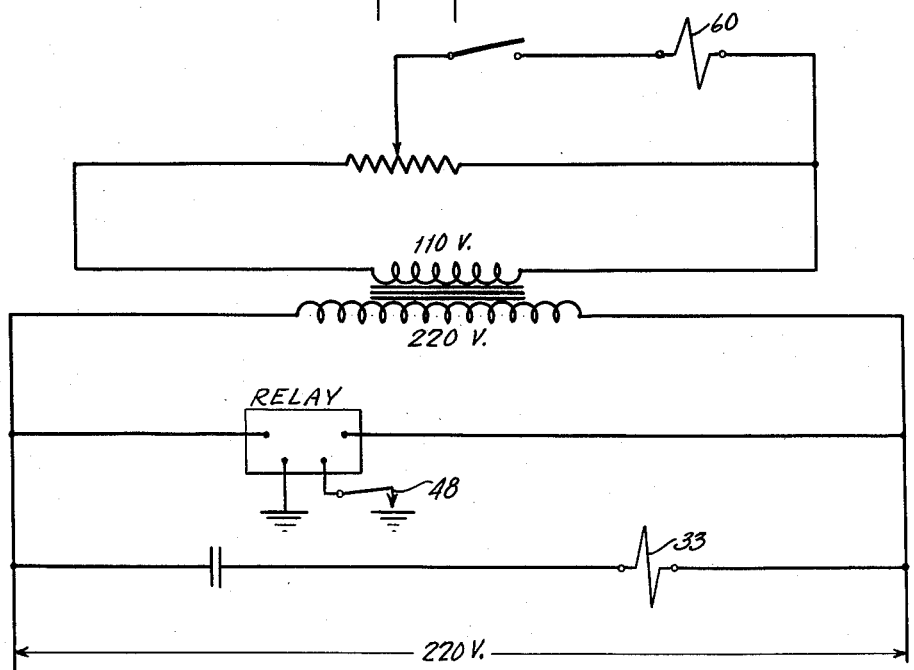

---

2,939,567

APPARATUS FOR FEEDING AND ORIENTING ARTICLES

Louis P. Mazura and Lawrence B. Patterson, Meadville, Pa., assignors to Talon, Inc., a corporation of Pennsylvania Filed Jan. 8, 1958, Ser. No. 707,768

7 Claims. (Cl. 198—33)

This invention relates to article feeding and orienting apparatus, and more particularly, to a hopper-type apparatus for feeding and orienting relatively intricate and small irregular shaped articles or parts.

Heretofore, various types of devices and hoppers have been suggested for feeding and orienting relatively small articles. While some of these have been satisfactory for some uses, others have been entirely unsatisfactory for these uses. In most of these devices there was no control over the quantity of articles being delivered to the feeding device for orientation and, as a result, a jam up of the articles frequently occurred at the point of orientation, which, of course, was unsatisfactory, in that such a jam interfered with the operation of the device and the orientation of the articles. Also, in most of these devices there was no means for automatically returning to the feeding device, those articles which were incorrectly positioned. This was usually done by collecting the incorrectly positioned articles in a container, and manually returning them to the feeding device which was not only inconvenient but inefficient and time consuming.

Accordingly, it is one of the objects of the present invention to provide an improved apparatus for feeding and orienting articles having means arranged therewith for delivering a predetermined quantity of articles to the feeding apparatus at periodic intervals.

It is another object of the invention to provide an improved apparatus for feeding and orienting articles having means arranged therewith for returning automatically to the feeding apparatus articles which have been incorrectly oriented.

It is a further object of this invention to provide an improved apparatus for feeding and orienting articles in which the means for delivering the articles to the feeding apparatus is controlled by the articles themselves as they move along the feeding apparatus toward the point of orientation.

It is a more specific object of the present invention to provide an improved apparatus for feeding and orienting articles consisting of two channel-like members arranged in side-by-side relation wherein the articles are moved along one channel-like member toward the point of orientation by vibration thereof and the incorrectly oriented articles moved in an opposite direction along the other channel-like member by vibration thereof and back into the other channel-like member for re-orientation.

It is still another object of this invention to provide a new and novel means for supporting the channel-like members as set forth above whereby a single vibratory unit is employed for vibrating the channel-like members in unison.

It is another object of the invention to provide an improved apparatus for feeding and orienting articles which is not only simple and inexpensive in its construction, but, at the same time, efficient and effective in its use.

Various other objects and advantages of this invention will be more apparent in the course of the following specification, and will be particularly pointed out in the appended claims.

In the accompanying drawings, there is shown for the purpose of illustration, an embodiment which our invention may assume in practice.

In these drawings:

Fig. 1 is a side elevational view, partly in section, of the improved article orienting apparatus of our invention, Fig. 2 is a sectional view taken on line 2—2 of Fig. 1, Fig. 3 is an enlarged plan view of the lower end of the apparatus, as shown in Fig. 2, Fig. 4 is a sectional view taken on line 4—4 of Fig. 3, Fig. 5 is a sectional view taken on line 5—5 of Fig. 3, Fig. 6 is a sectional view taken on line 6—6 of Fig. 1, Fig. 7 is a sectional view taken on line 7—7 of Fig. 6, Fig. 8 is a perspective view of the oscillating chute-like member, Fig. 9 is a perspective view of the shaft to which the chute-like member shown in Fig. 8 is attached, Fig. 10 is an enlarged perspective view of an example, a spring, of one type of article that may be oriented with our improved apparatus, Fig. 11 is a sectional view taken on line 11—11 of Fig. 3, and Fig. 12 is a wiring diagram of the article feeding control.

Referring more particularly to the drawings, and especially Fig. 1, the improved apparatus of our invention consists of a base 2 which is mounted on a frame 3 in any suitable manner, preferably by means of bolts 4, as shown. On this base 2, there is arranged a plurality of spaced-apart brackets 5, three in the present instance, to each of which there is attached by means of bolts 6 an upwardly extending leaf-like spring member 7 inclined to the right as shown in Fig. 1. On the upper ends of these leaf-like spring members 7, there is arranged an elongated channel-like supply table 8 which is attached to the the leaf-like spring members 7 by means of bolts 9.

There is also arranged on the base 2, a pair of spaced-apart brackets 10 to which there is attached by means of bolts 12, a pair of upwardly extending leaf-like spring members 13 which are inclined to the left as shown in Fig. 1, and in a direction opposite to the leaf-like spring members 7 for a purpose hereinafter to be described. That is to say, the angle of the leaf-like spring members 7 and 13 to the vertical are the same but disposed on the opposite sides of the vertical. On the upper ends of these leaf-like spring members 13, there is arranged an elongated channel-like member or trough 14 which is attached to these leaf-like spring members by means of bolts 15. This channel-like member 14 is positioned directly next to the side wall 44 of the supply table 8 and is disposed substantially parallel thereto. At the lower end of this channel-like member 14, there is arranged in the side wall thereof, an opening or passageway 16 which communicates with the supply table 8 adjacent the point of orientation, as more clearly shown in Figs. 2 and 3 of the drawings. Adjacent the upper end of this channel-like member 14 there is arranged also in the same side wall thereof, another opening or passageway 17 which communicates with the supply table 8 at a point intermediate the length thereof.

At the upper end of the supply table 8, there is arranged thereabove, a hopper 18 which is mounted on a bracket 19 which, in turn, is mounted on the base 2. Forwardly of this hopper 18 there is arranged for oscillating movement, a chute-like member 21 for delivering the articles to be oriented from the hopper to the supply table 8 in a manner to be described. This chute-like table 8 in a manner to be described. This chute-like member 21 is attached to a rotatable shaft 22 by means of screws 23 which shaft is mounted in a pair of suitable bearings 24 arranged on the supply table 8. Approximately one-half of this shaft 22 is preferably cut away so as to provide a flat surface 25 to which the chute-like member 21 is attached, as more clearly shown in Figs. 7 and 9 of the drawings. This shaft 22 is so mounted that it can be rotated through an arc of approximately ninety degrees by means of a lever 26 attached to the outer end thereof. This lever 26 is attached to the plunger 27 of an air cylinder 28 pivotally attached to a bracket 29 which bracket is attached to the side of the supply table 8, as at 30. There is provided a tension coil spring 76 for returning and maintaining the chute-like member 21 in its retracted or closed position.

There is also mounted on the bracket 19, an air flow control 31 which is connected to the cylinder 28 by means of the connection 32. Also, on the bracket member 19, there is mounted a solenoid valve 33 which is connected to the flow control 31 by means of a connection 34 and to a suitable source of air (not shown) by means of the connection 35. This energization of this solenoid 33 is controlled by a relatively sensitive relay (not shown) which in turn is controlled by the articles being oriented as they pass along the supply table in a manner to be described.

In the bottom wall of the hopper 18, there is an opening 36 and there is mounted on the supply table 8 directly therebelow, a substantially rectangular-shaped, box-like, auxiliary hopper 37 with the front wall being open, as at 38, in which opening the chute-like member 21 extends, as more clearly shown in Figs. 2 and 7. The bottom wall 39 of this auxiliary hopper 37 is substantially flush with the inner end of the chute-like member 21 where the latter is attached to the flat side 25 of the shaft 22 when the chute-like member 21 assumes a closed position, as shown in the full lines of Fig. 7. When this chute-like member is disposed in its retracted or closed position, a pocket is formed, as at 75 at the opening or mouth 38 of the auxiliary hopper 37 so as to permit a quantity of springs 80 to flow thereinto.

Above the shaft 22 and chute-like member 21, there is arranged preferably a substantially L-shaped leaf spring member 40 which is attached to the front wall of the hopper 18, as at 41. The lower portion of the L-shaped part of this leaf spring 40 preferably conforms substantially to the diameter of the shaft 22, so that when the shaft rotates ninety degrees, this spring 40 shuts off the flow of the springs 80 other than to the pocket 75. When the chute-like member 21 is in its retracted or closed position, it contacts the forward leg of the spring member 40. When the chute-like member 21 is in its protracted or open position, as shown in the broken lines of Fig. 7, the inner edge of the chute-like member directly opposite the shaft 22 to which it is attached contacts the spring 40 adjacent the lower curved portion thereof blocking the flow of springs 80 but permits the springs 80 in the pocket 75 to flow therefrom out through the chute-like member 21 to the supply table 8.

As more clearly shown in Fig. 2 of the drawings, intermediate the length of the supply table 8, there is arranged diagonally thereacross so as to extend into the path of the articles to orient as they pass therealong, a baffle member 43 which is attached to the side wall 44 of the channel-like supply table 8, as at 45. On the opposite side wall 46 of this supply table 8, directly opposite the member 43 there is attached thereto, as at 47, a wire-like sensitive finger-like contact member 48 which also extends diagonally across the supply table into the path of the articles as they pass therealong for a purpose hereinafter to be described. This contact member 48 is connected at 47 to a wire in an electrical circuit which controls the relay for actuating the chute-like member 21.

At the lower end of the supply table 8 immediately below the contact finger 48, there is arranged a diagonally extending rail-like member 49 against which the springs 80 move for orienting the same. On top of this rail-like member there is positioned a hold-down guide plate 50 which is secured to the supply table by means of screws 51. Below this rail-like member there is positioned a spacer member 52. Both the rail-like member and the spacer member are curved at the bottom end thereof, as at 53. Directly opposite these curved portions 53 of the rail-like member 49 and spacer member 52, there is arranged a curved feeder chute selector member 54 which is spaced, as at 55, from the rail-like member. This selector member is secured in position by means of a plate 56 and screws 57. Directly below the end of the rail-like member 49 and the selector 54, there is arranged a chute 58 having a slot 59 in the side thereof corresponding to the space 55.

Below the supply table 8, there is suitably mounted on the base 2, an electro-magnetic vibrator 60 which co-operates with a shoulder arm 61 arranged on the bottom side of the supply table for vibrating the same thereby causing the articles to be oriented to gravitate and move along the supply table. There is arranged on the side wall 44 of the supply table 8, an outwardly extending bracket member 62 on which there is mounted an adjustable screw 63 having a pusher pad 64 arranged on one end thereof. This pad 64 co-operates with the adjacent leaf-like spring member 13 and is forced thereagainst by the vibrating action of the supply table 8 to which it is attached, so as to preload the leaf-like springs 13 and vibrate the channel-like member 14. Thus, the push or thrust is positive in one direction and the leaf-like spring members 13 return it whereby both the supply table and channel-like member 14 act in unison.

While our improved apparatus may be successfully used, with minor changes, for orienting various types of small articles or parts, as for example, pulls, sliders, fastener elements and other component parts of slide fasteners, there is shown in the present instance, an intricate spring member 80 for automatic lock sliders for slide fasteners which heretofore has been difficult to orient for automatic assembling equipment. Such a slider is shown in the co-pending application of Alexander M. Brown, Serial No. 535,009, filed September 19, 1955. This spring member 80, as shown in Fig. 10, consists of a body member having a portion 71 at one end thereof bent substantially at right angles to the main body and having on the extreme outer end thereof a locking prong 72. Intermediate the length of the body portion, there is struck up therefrom, a portion 73 which acts to hold the spring securely in place on a slider body (not shown). On the opposite end of the body, there is arranged an outwardly extending finger-like portion 74 which also acts to hold the spring securely in position on the slider body.

Having described the construction and arrangement of the improved apparatus of the present invention, it functions in the following manner. It will be assumed that a quantity of springs 80, as shown in Fig. 10, have been disposed in the hopper 18. As such, it will be seen that the auxiliary hopper 37 positioned therebelow is also filled with springs as is the pocket 75 as the chute-like member 21 is normally in its closed position, as shown in Figs. 1 and 7. The electric circuit which contains an electronic relay is then connected to a source of current.

The relay is normally actuated by contact of the spring members 80 with the finger-like contact member 48 as they move along the supply table 8. However, the relay is of the type which is actuated by the contact of the springs with the contact member, or lack of them on the upper end of the supply table 8. When no springs 80 are in contact with the feeler or contact member 48, the circuit is closed by the electronic relay. This relay then actuates the solenoid valve 33 thereby permitting air pressure to flow into the air cylinder 38 thus actuating the plunger 27 to discharge the quantity of springs 80 out of the pocket 75 into the chute-like member 21 and onto the supply table 8, as shown in the broken lines of Fig. 7.

That is to say, when there are no springs 80 on the supply table 8 to bridge the normally open actuating contacts of the relay, the relay becomes energized to actuate the spring metering solenoid 33. When this solenoid is energized, springs 80 are dumped or delivered from the chute-like member 21 onto the supply table 8 and when they come in contact with the contact member 48 and bridge the relay actuating contacts, the relay is de-energized. When the relay is de-energized, the solenoid 33, in turn, is de-energized. If the actuating contacts of the relay are not bridged by contact of the springs 80 for a short period of time, for example, one and one-half seconds maximum, the relay automatically becomes energized so as to actuate the chute-like member 21 to repeat the cycle.

These springs will gravitate along the supply table 8, due to the vibrations transmitted thereto by the electromagnetic vibrator 60, until they contact the feeler or contact member 48, at which time, the circuit is opened and the solenoid valve 33 is de-energized thereby shutting off the flow of air to the air cylinder 28. The plunger and chute-like member are then moved to their retracted or closed position by the action of the tension spring 76 so that the pocket 75 of the chute-like member 21 is in position to receive another quantity of springs from the auxiliary hopper. It will be understood that an additional quantity of springs is not delivered to the supply table until the original quantity almost pass the contact or feeler member 48, at which time, the cycle is repeated so that the chute-like member 21 will deliver another quantity of springs to the supply table.

Since the relay operates on a normally open setting, contact of the springs with the contact member 48 must be maintained. The relay compensates for any time delay, and for any broken contacts of the springs 80 with the contact member, so that when the no-contact period becomes longer than the relay setting, the relay actuates automatically to repeat the cycle.

After the springs 80 move below the contact finger 48, they continue to gravitate along the supply table 8 until they come in contact with the rail-like member 49 and they continue to move therealong until they reach the extreme lower end of the supply table 8, as shown in the lower left-hand corner of Fig. 2. Those springs 80 that have been correctly presented to the rail-like member 49, as shown in Fig. 4, will then pass around the curved portion 53 of the rail-like member and in the space 55 and down into the chute 58. However, those springs that have not been correctly presented or oriented will pass over the rails and through the passageway 16 and into the channel-like member 14. They will gravitate therealong, due to the vibrating action to which the channel-like member is subjected, in a direction opposite to that of the flow of the springs or on the supply table 8, and returned to the supply table through the passageway 17 for re-orientation.

As a result of our invention, it will be seen that there is incorporated with the article feeding apparatus an automatic metering device which delivers to the feeding apparatus a predetermined quantity of articles to be oriented. It will also be seen that there is arranged with the apparatus, vibrating-type article feeding apparatus in which the feeding table or channel is vibrated to impart advancing movement to the articles along the channel to the point of orientation and that those articles which have been improperly positioned will be ejected and automatically returned to the feeding table or apparatus for re-orientation.

While we have shown and described an embodiment which our invention may assume in practice, it will be understood that this embodiment is merely for the purpose of illustration and description, and that other forms may be devised within the scope of our invention as defined in the appended claims.

What we claim as our invention is:

1. Apparatus for orienting articles including a base, a supply table mounted on said base, a hopper arranged above said supply table, an oscillating chute-like member arranged above said table and below and opposite an opening in said hopper for receiving and delivering periodically a quantity of articles to said supply table, means for actuating said chute-like member, means controlled by the articles as they move along said supply table for actuating said last mentioned means, means arranged adjacent the opposite end of said table for receiving the articles which have been correctly oriented, a channel-like member mounted on said base independently of said supply table and extending substantially parallel thereto, said channel-like member having at least a pair of passageways communicating with said supply table, one of said passageways being positioned adjacent the point of orientation and the other being positioned intermediate the length of said supply table, and means for vibrating both of said supply tables and said channel-like member, said supply table and said channel-like member being so mounted on the base that the articles will move along the supply table in one direction toward the point of orientation due to the vibrations and so that the incorrectly oriented articles will pass back through the channel-like member in the opposite direction onto the supply table due to the vibrations for re-orientation.

2. Apparatus for orienting articles, as defined in claim 1, wherein the means for actuating the chute-like member consists of an air cylinder having the plunger thereof connected to a shaft upon which said chute-like member is mounted, a valve connected to said air cylinder, a solenoid for actuating said valve, and a finger-like contact member arranged diagonally across said supply table in the path of articles as they pass therealong, said finger-like contact member adapted to control the energization of said solenoid.

3. Apparatus for orienting articles, as defined in claim 1, wherein the means arranged adjacent the opposite end of said supply table for orienting and receiving the articles consists of a rail-like member arranged angularly at the opposite end of the table against which the articles move along for correctly orienting them, and a chute-like member arranged adjacent the lower end of said rail-like member for receiving the correctly oriented articles.

4. Apparatus for orienting articles of the class described including a supply table having side walls, means arranged adjacent one end of said table for delivering the articles thereto, a channel-like member arranged to one side of said supply table and substantially parallel thereto, a passageway arranged in the side wall of said supply table communicating with said channel-like member adjacent one end thereof, a rail-like member arranged angularly at the opposite end of the table against which the articles move along for correctly orienting the same, an opening arranged at the lower end of said rail-like member through which the correctly oriented articles pass, a chute-like member arranged adjacent the lower end of said rail-like member opposite said opening for receiving the correctly oriented articles, another opening arranged in the side wall of said supply table adjacent said first mentioned opening and communicating with said channel-like member, means arranged adjacent the lower end of said rail-like member for deflecting those articles not correctly oriented into and through said last mentioned opening and into said channel-like member, and means for vibrating both said supply table and said channel-like member whereby the articles will initially move along said supply table in one direction toward the point of orientation and whereby the incorrectly oriented articles will pass back through the channel-like member in the opposite direction and through said passageway and back onto said supply table for reorientation.

5. Apparatus for orienting articles of the class described, as defined in claim 4, including a finger-like contact member arranged diagonally across said supply table intermediate the length thereof which extends into the path of the articles as they pass therealong and adapted to contact the same, means responsive to the contact of said articles with said finger-like member for controlling the actuation of said chute-like member whereby a quantity of articles will be delivered from said chute-like member to said supply table when no articles are in contact therewith on the supply table.

6. Apparatus for orienting articles of the class described including a supply table, a hopper arranged above said table adjacent one end thereof, a chute-like member arranged above said table and below and opposite an opening said hopper for receiving a quantity of articles therefrom, means for periodically actuating said chute-like member so as to deliver a metered quantity of articles from said chute-like member to said supply table, a channel-like member arranged to one side of said supply table and substantially parallel thereto, a passageway arranged in the side wall of said supply table communicating with said channel-like member adjacent one end thereof, a rail-like member arranged angularly at the opposite end of the table against which the articles move along for correctly orienting the same, an opening arranged at the lower end of said rail-like member through which the correctly oriented articles pass, a chute-like member arranged adjacent the lower end of said rail-like member opposite said opening for receiving the correctly oriented articles, another opening arranged in the side wall of said supply table adjacent said first mentioned opening and communicating with said channel-like member, means arranged adjacent the lower end of said rail-like member for deflecting those articles not correctly oriented into and through said last mentioned opening and into said channel-like member, and means for vibrating both said supply table and said channel-like member whereby the articles will initially move along said supply table in one direction toward the point of orientation and whereby the incorrectly oriented articles will pass back through the channel-like member in the opposite direction and through said passageway and back onto said supply table for reorientation.

7. Apparatus for orienting articles of the class described, as defined in claim 6, including a finger-like contact member arranged diagonally across said supply table intermediate the length thereof which extends into the path of the articles as they pass therealong and adapted to contact the same, means responsive to the contact of said articles with said finger-like member for controlling the actuation of said chute-like member whereby a quantity of articles will be delivered from said chute-like member to said supply table when no articles are in contact therewith on the supply table.

References Cited in the file of this patent

UNITED STATES PATENTS

| | | |
|---|---|---|
| 659,746 | Hargraves | Oct. 16, 1900 |
| 1,888,520 | Twomley | Nov. 22, 1932 |
| 2,540,934 | Cook | Feb. 6, 1951 |
| 2,778,478 | Brook | Jan. 22, 1957 |

FOREIGN PATENTS

| | | |
|---|---|---|
| 1,071,920 | France | Mar. 10, 1954 |